United States Patent
Banerjee

(10) Patent No.: US 8,510,499 B1
(45) Date of Patent: Aug. 13, 2013

(54) SOLID STATE DRIVE CACHING USING MEMORY STRUCTURES TO DETERMINE A STORAGE SPACE REPLACEMENT CANDIDATE

(75) Inventor: Anindya Banerjee, Pune (IN)

(73) Assignee: Symantec Corporation, Mountain View, CA (US)

( * ) Notice: Subject to any disclaimer, the term of this patent is extended or adjusted under 35 U.S.C. 154(b) by 268 days.

(21) Appl. No.: 12/870,971

(22) Filed: Aug. 30, 2010

(51) Int. Cl.
*G06F 12/00* (2006.01)
(52) U.S. Cl.
USPC ............................ 711/103; 711/112
(58) Field of Classification Search
USPC .................................. 711/103, 112
See application file for complete search history.

(56) References Cited

U.S. PATENT DOCUMENTS

| | | | |
|---|---|---|---|
| 2009/0172308 A1* | 7/2009 | Prins et al. | 711/154 |
| 2011/0010514 A1* | 1/2011 | Benhase et al. | 711/162 |
| 2011/0022801 A1* | 1/2011 | Flynn | 711/120 |
| 2011/0202732 A1* | 8/2011 | Montgomery | 711/154 |
| 2012/0023305 A1* | 1/2012 | Satoyama et al. | 711/170 |

\* cited by examiner

*Primary Examiner* — Hashem Farrokh
(74) *Attorney, Agent, or Firm* — Campbell Stephenson LLP

(57) ABSTRACT

A mechanism to identify data that can be removed from a solid state drive (SSD) cache by determining a least recently accessed memory region of the SSD is provided. This functionality is provided by using a tree data structure to store a table mapping storage volume data locations to SSD data locations and associating a time stamp with each entry. The time stamp is updated with each access to the associated SSD location. Advantages of the tree data structure are utilized to efficiently determine an SSD memory location associated with an oldest time stamp in order to make that SSD memory location available for storage of recently accessed data from the storage volume.

17 Claims, 6 Drawing Sheets

US 8,510,499 B1

SOLID STATE DRIVE CACHING USING MEMORY STRUCTURES TO DETERMINE A STORAGE SPACE REPLACEMENT CANDIDATE

FIELD OF THE INVENTION

The present invention relates to the field of data storage, and particularly to freeing up cache memory space on a solid state drive associated with a hard disk drive.

BACKGROUND OF THE INVENTION

An ever-increasing reliance on information and computing systems that produce, process, distribute, and maintain such information in its various forms continues to put great demands on techniques for providing data storage and access to that data storage. Today's data centers and cloud computing environments require increased input/output (I/O) performance to support large-scale applications such as databases, web servers, e-commerce applications, file servers, and electronic mail. These applications typically accommodate a large number of end-users. To meet service requirements of these end-users, data center operators deploy servers with high I/O throughput. The larger the number of end-users on the servers translates to an increase in the number of I/O operations required from these servers. As a consequence, servers are often maintained at low storage capacity utilization in order to meet the required number of I/Os, which is an inefficient use of resources.

Solid state drives (SSD) are storage devices capable of high I/O performance. An SSD uses flash components to store data and, unlike a hard disk drive (HDD), has no moving parts and no rotating media. SSDs offer a higher read bandwidth, higher I/Os per second, better mechanical reliability than HDDs, and higher resistance to shock and vibrations. But SSDs have more limited capacity than do HDDs, and therefore generally cannot be used as a replacement for HDDs in a data center.

SSDs can, however, be used to improve I/O performance of data center servers by functioning as a caching layer between HDDs and server main memory. HDD data can be copied to an associated SSD upon access of that data in order to improve the speed of subsequent access to that data. But since the SSD cache will not have the same storage capacity as the associated HDD, the SSD will ultimately cease to have sufficient free space to copy newly accessed data from the HDD. A mechanism for efficiently identifying areas of memory in the SSD cache to make available is desirable.

SUMMARY OF THE INVENTION

Embodiments of the present invention identify data that can be removed from a solid state drive cache by determining a least recently accessed memory region of the SSD. Embodiments of the present invention provide this functionality by using a tree data structure to store a table mapping storage volume data locations to SSD data locations and associating a time stamp with each entry. Embodiments of the present invention update the time stamp with each access to the associated SSD location. Embodiments of the present invention further use advantages of the tree data structure to efficiently determine an SSD memory location associated with an oldest time stamp in order to make that SSD memory location available for storage of recently accessed data from the storage volume.

Embodiments of the present invention provide a method, system and computer-readable storage medium for storing a mapping entry including a mapping of a storage volume data location to a SSD memory location in a tree data structure, storing data from the storage volume data location at the SSD memory location, storing a timestamp with the mapping entry, determining an oldest timestamp of all entries stored in a node of the tree data structure, storing the oldest timestamp in association with a key entry linked to the node of the tree data structure in a parent of the node, and finding a least-recently-accessed SSD memory location using the timestamp information. Aspects of the above embodiment provide that the timestamp is associated with the last time the data in the SSD memory location is accessed. Another aspect of the above embodiment is that the least recently accessed SSD memory location has a mapping entry stored with the oldest timestamp.

Another aspect of the above embodiment provides for finding the least recently accessed SSD memory location by searching a node of the tree data structure for an entry stored with the oldest timestamp, if the node is a leaf node then the SSD memory location is the sought for memory location, and if the node is not a leaf node then a key associated with the timestamp is identified and the key is followed to a child node where the searching continues. A further aspect of the above aspect is performing the finding of a least recently accessed SSD memory location in response to a request to store additional data in the SSD but the SSD has insufficient space to store the additional data. Another aspect further involves deleting the entry stored with the oldest timestamp, storing the second data at the SSD memory location, storing a second mapping entry including a mapping of the storage volume location of the second data to the SSD memory location, and storing a second timestamp with the second mapping entry.

A further aspect of the above embodiment provides for the timestamp to be a clock value or a counter value. Another aspect of the above embodiment updates the timestamp upon access to the data stored in the SSD memory location.

The foregoing is a summary and thus contains, by necessity, simplifications, generalizations and omissions of detail. Consequently, those skilled in the art will appreciate that the Summary is illustrative only and is not intended to be in any way limiting. Other aspects, inventive features, and advantages of the present invention, as defined solely by the claims, will become apparent in the non-limiting Detailed Description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention identify data that can be removed from a solid state drive cache by determining a least recently accessed memory region of the SSD. Embodiments of the present invention provide this functionality by using a tree data structure, such as a B+ tree, to store a table mapping storage volume data locations to SSD data locations and associating a time stamp with each entry. Embodiments of the present invention update the time stamp with each access to the associated SSD location. Embodiments of the present invention further use advantages of the tree data structure to efficiently determine an SSD memory location associated with an oldest time stamp in order to make that SSD memory location available for storage of recently accessed data from the storage volume.

Solid State Drive Caching

Figure 1:
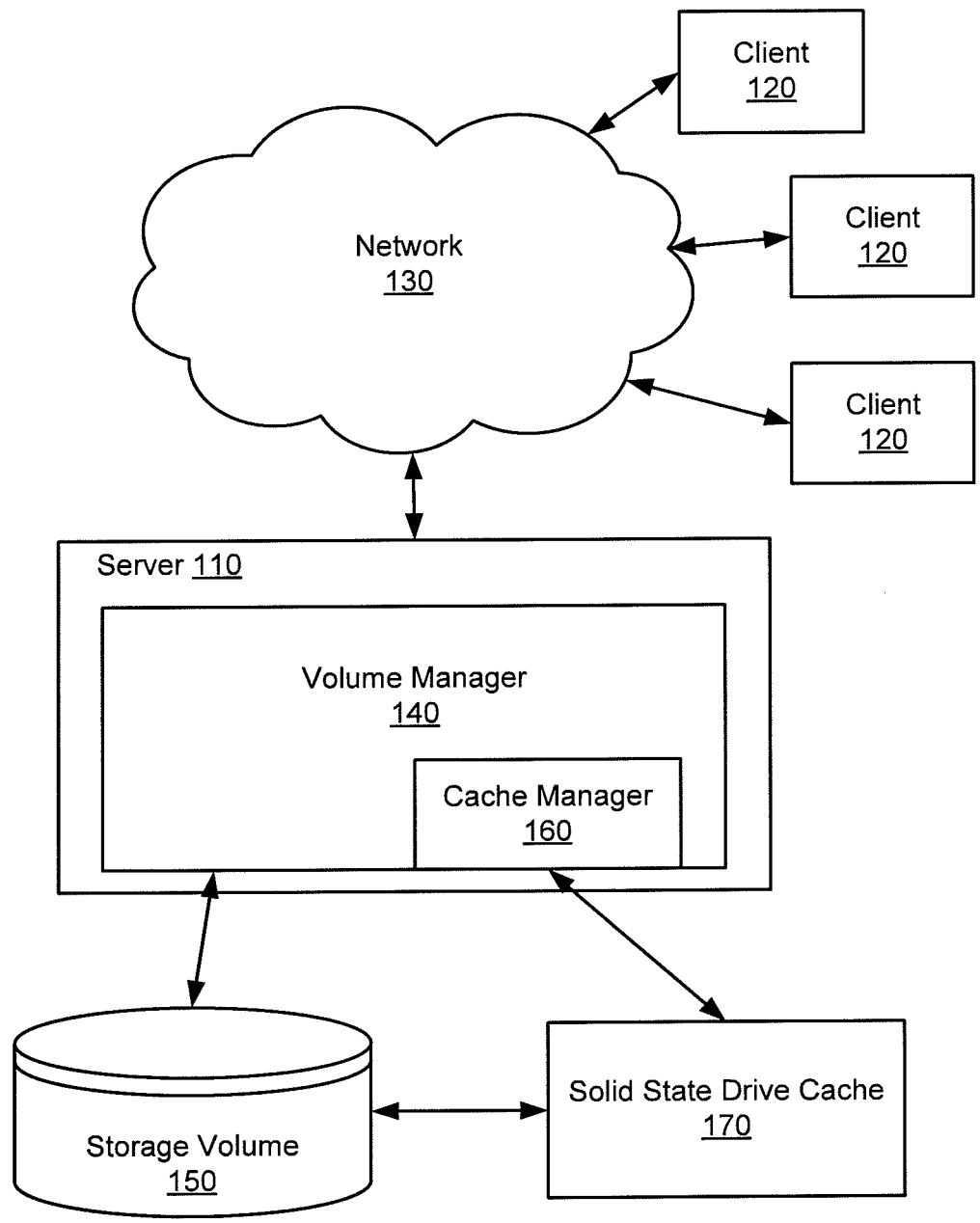
FIG. 1 is a simplified block diagram illustrating an example of a system incorporating a solid state drive cache, in accord with embodiments of the present invention.

FIG. 1 is a simplified block diagram illustrating an example of a system incorporating a SSD cache, in accord with embodiments of the present invention. A server 110 hosting a mechanism for providing access to disk volumes or file systems on disk volumes (e.g., volume manager 140) is coupled to one or more client computers 120 via a network 130. Embodiments of network 130 can include, for example, a local area network, metro area network, wide area network, storage area network, or any combination thereof. Embodiments of the present invention are not limited by the type or protocols of communication for network 130. Server 110 can provide access to disk volume or file system space either to directly-coupled disk volumes or by disk volumes that are served to server 110 via a storage area network, network attached storage, a storage appliance, and the like.

As illustrated, server 110 hosts a volume manager 140 that provides access to a storage volume 150. Storage volume 150 can include one or more physical hard disk drives (HDD) and data stored thereon. Volume manager 140 also provides, via cache manager 160, access to a solid state drive (SSD) cache 170. The SSD cache is configured to store data accessed from storage volume 150 and to be the source of that data for subsequent accesses to that data until that data is removed from the SSD cache. Typically, the SSD cache will be as large as 10% of the storage size of an associated storage volume, and will therefore not have capacity to store all of the data stored on the associated storage volume. Thus, a mechanism for identifying candidate data to be removed from the SSD cache when no longer needed, or when not accessed recently, is desirable.

Figure 2:
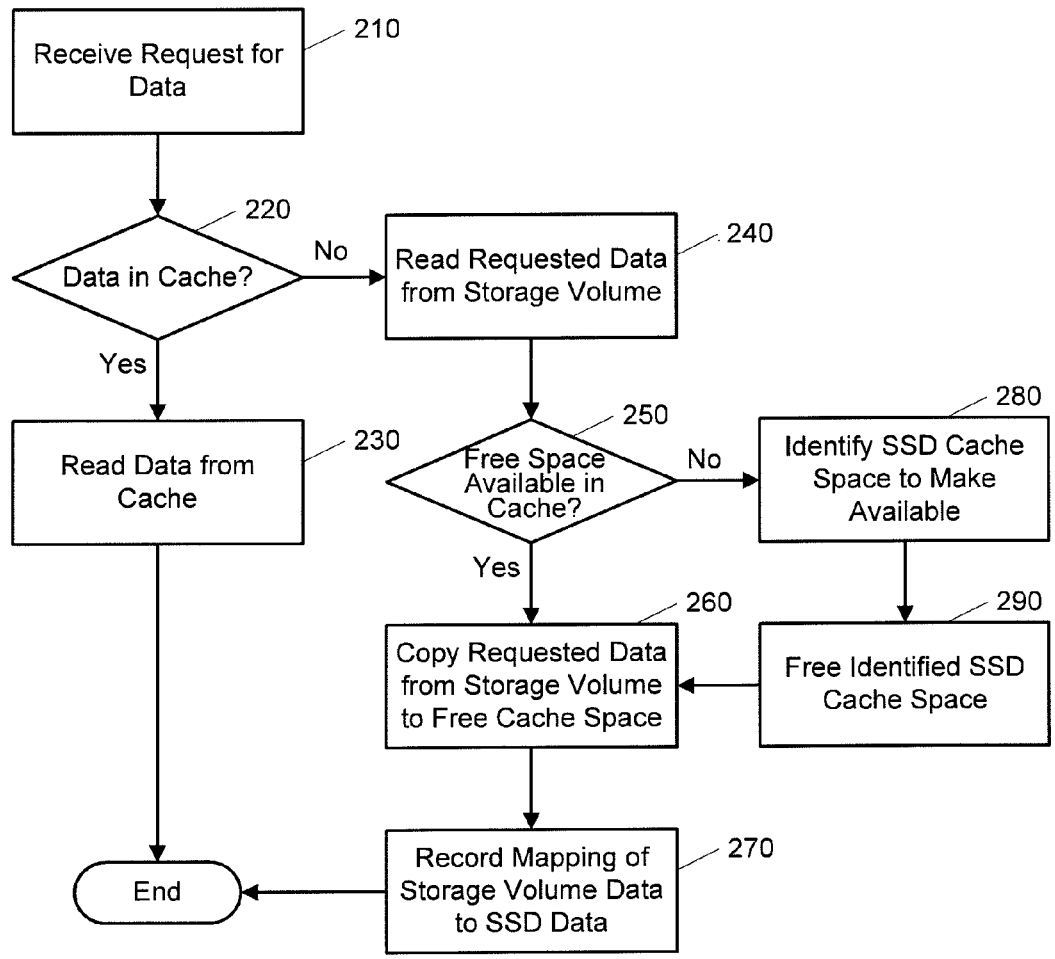
FIG. 2 is a simplified flow diagram illustrating a method for accessing data in a data caching system, in accord with embodiments of the present invention.

FIG. 2 is a simplified flow diagram illustrating a method for accessing data in a data caching system, in accord with embodiments of the present invention. A request is received for data stored in a storage volume (e.g., storage volume 150) (210). The data request can be received from, for example, any one of clients 120 or a user accessing server 110 in another manner. The request can be received by, for example, a volume manager 140. A determination is then made as to whether the requested data is located in the cache (e.g., SSD cache 170) (220). Such a determination can be performed by checking a mapping table that includes entries associating storage blocks from the storage volume to memory locations in the SSD cache. Such a mapping table can be maintained, for example, by cache manager 160, which can also perform the table lookup. If the requested storage volume data locations are mapped to the SSD cache, then the requested data can be read from the cache (230). Once the data is read from the SSD cache, that data can be provided by the server to the requesting entity.

If the mapping table lookup does not provide a corresponding location in the SSD cache, this means that the requested data has not previously been provided to the SSD cache or the SSD cache currently does not have the requested data stored therein. The requested data is then read from the storage volume and provided to the requesting entity (240). The read can be performed as with any normal read through the use of disk calls provided by, for example, volume manager 140 to storage volume 150. If the requested data should be cached, then a determination is then made as to whether there is sufficient free space available in the SSD cache to store the data read from the storage volume (250). If sufficient free space is available, then the data read from the storage volume is copied to the free space in the SSD cache (260). The mapping table is then updated to include an entry identifying the memory location from the hard disk drive and identifying the location in the SSD cache where the cached image is stored (270).

If sufficient free space for the data read from the disk volume is not found (250), then cache memory space is identified for freeing up so that the new data can be stored in the cache (280). As will be discussed in further detail below, one method of identifying cache memory space to free up involves determining that cache space that has least recently been accessed. Once the cache memory space to be freed up has been identified, the cache manager can delete the data stored in the identified cache space and the entry associated with the freed up cache memory space in the mapping table can be deleted (290). At this point, the cache manager, for example, can perform the tasks related to copying data from the storage volume to the freed up space in the cache (260) and record the mapping of the hard disk drive storage space to the solid state drive storage space (270).

In this manner, data can be read from the SSD cache in order to provide quick I/O response times. If the data is not available in the SSD cache, the data can be accessed from the hard disk drive and then stored in an appropriate location in the solid state drive. It should be noted, that the structures referenced above for both FIGS. 1 and 2 for performing the various tasks in FIG. 2, are provided by nature of an example only. Alternate structures and devices can perform the tasks or part thereof. Embodiments of the present invention are not limited to the structures discussed above.

Identifying and Freeing Up Cache Memory Space

In order to track the mappings from data storage space in a storage volume and associated data storage space in an SSD cache, a mapping index is maintained. A key to the index can be the storage volume storage location. In this manner, when data stored in the storage volume is requested, the data location can be rapidly searched in the index to determine whether the storage volume data has already been stored on the solid state drive. One example of a data structure that can be used to efficiently store entries of such a mapping table is a tree data structure, such as a B+ tree. Given the large number of entries that can be present in such a mapping table because of the size of the solid state drive and the number of data blocks present in the storage volume, a tree data structure provides a flexible and efficient data storage mechanism for referencing the information in the mapping table. The mapping table tree data structure can be stored either in memory of the server providing access to the SSD or on the SSD itself for quick access.

Figure 3A:
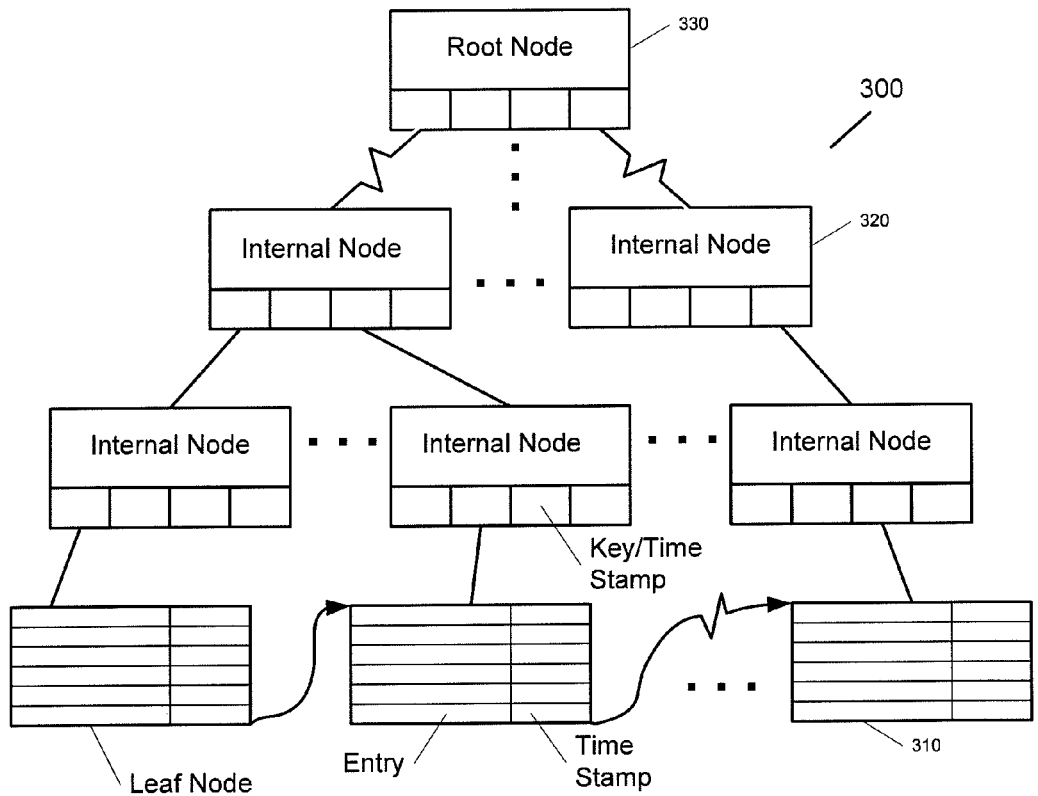
FIG. 3A illustrates an example B+ tree data structure 300 that can be used in conjunction with embodiments of the present invention.

FIG. 3A illustrates an example B+ tree data structure 300 that can be used in conjunction with embodiments of the present invention. A B+ tree has three types of nodes: a leaf node 310, an internal node 320, and a root node 330. In a B+ tree, in contrast to, for example, a B-tree, all records are stored at the leaf node level of the tree, while keys to lower level nodes are stored in the internal nodes. Thus, each entry of the mapping table would be located as an entry in a leaf node. Each leaf node can be linked to one another as a linked list, thereby making range queries or an ordered iteration through the leaf node entries simpler and more efficient. In a typical B+ tree, each internal node contains a key pointer to one or more child nodes of that internal node. A root node is the top level internal node which can contain two or more key pointers to internal nodes in the level immediately beneath the root node.

Embodiments of the present invention modify entries and keys stored in a typical B+ tree data structure by including a time stamp indicating the latest time the entry was accessed. Such a time stamp can be either a true clock time stamp or a logical sequence number or checkpoint number increasing linearly over time or with the number of accesses to data stored in the SSD. Through such time stamps, the last accessed time for an entry can be determined either absolutely (e.g., through the use of a clock time stamp) or relatively (e.g., through the use of an increasing checkpoint number).

Figure 3B:
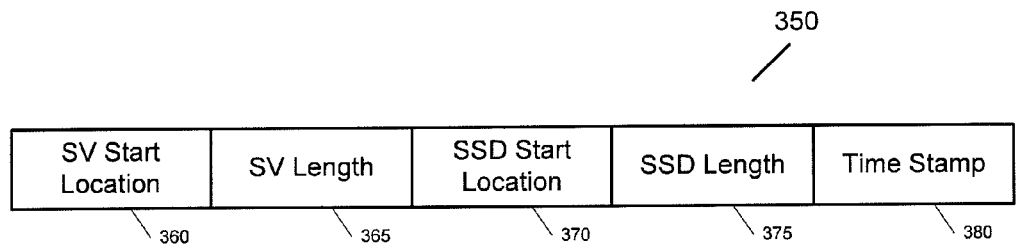
FIG. 3B illustrates an example of data that can be contained in a leaf node entry 350, in accord with embodiments of the present invention.

FIG. 3B illustrates an example of data that can be contained in a leaf node entry 350, in accord with embodiments of the present invention. A value representing the hard disk drive or storage volume starting block (360), which can also be the index value of the mapping table, a length or number of blocks of the data found on the hard disk drive or storage volume (365), the SSD starting memory location (370), the SSD length or number of blocks (375), and the time stamp (380). In a typical B+ tree used to track mapping for a SSD cache, a leaf node can have on the order of 350 entries, while each internal node can have on the order of 350 keys pointing to child nodes.

One goal of embodiments of the present invention is to be able to efficiently locate a cache entry that has least recently been accessed. This can be accomplished by modifying the typical B+ tree to include with the keys in an internal node the oldest time stamp reflected in that internal node's child nodes. Thus, for example, an internal node having only leaf nodes as its children, contains not only keys to the leaf nodes, but also a time stamp associated with each key that is the earliest timestamp recorded for all the entries of the leaf node pointed to by that key. Each key in an internal node will have such a time stamp.

When data associated with a leaf node entry is accessed, the time stamp associated with that leaf node entry will be updated. If appropriate, time stamps for all the keys leading to the root from the leaf node entry will be updated if the previous values for those entries were due to the accessed leaf node entry.

Using the timestamps, and the tree data structure, the method for determining the best candidate for deletion in the SSD cache involves following a path through the tree data structure of the least or earliest time stamp from the root node to a node storing the entry associated with the earliest timestamp (e.g., a leaf node of a B+ tree). Once the appropriate entry has been located, the cache manager can delete the data stored on the SSD cache or otherwise indicate that the memory location can be overwritten, and the entry associated with that space on the SSD cache is be removed from the mapping index.

Figure 4:
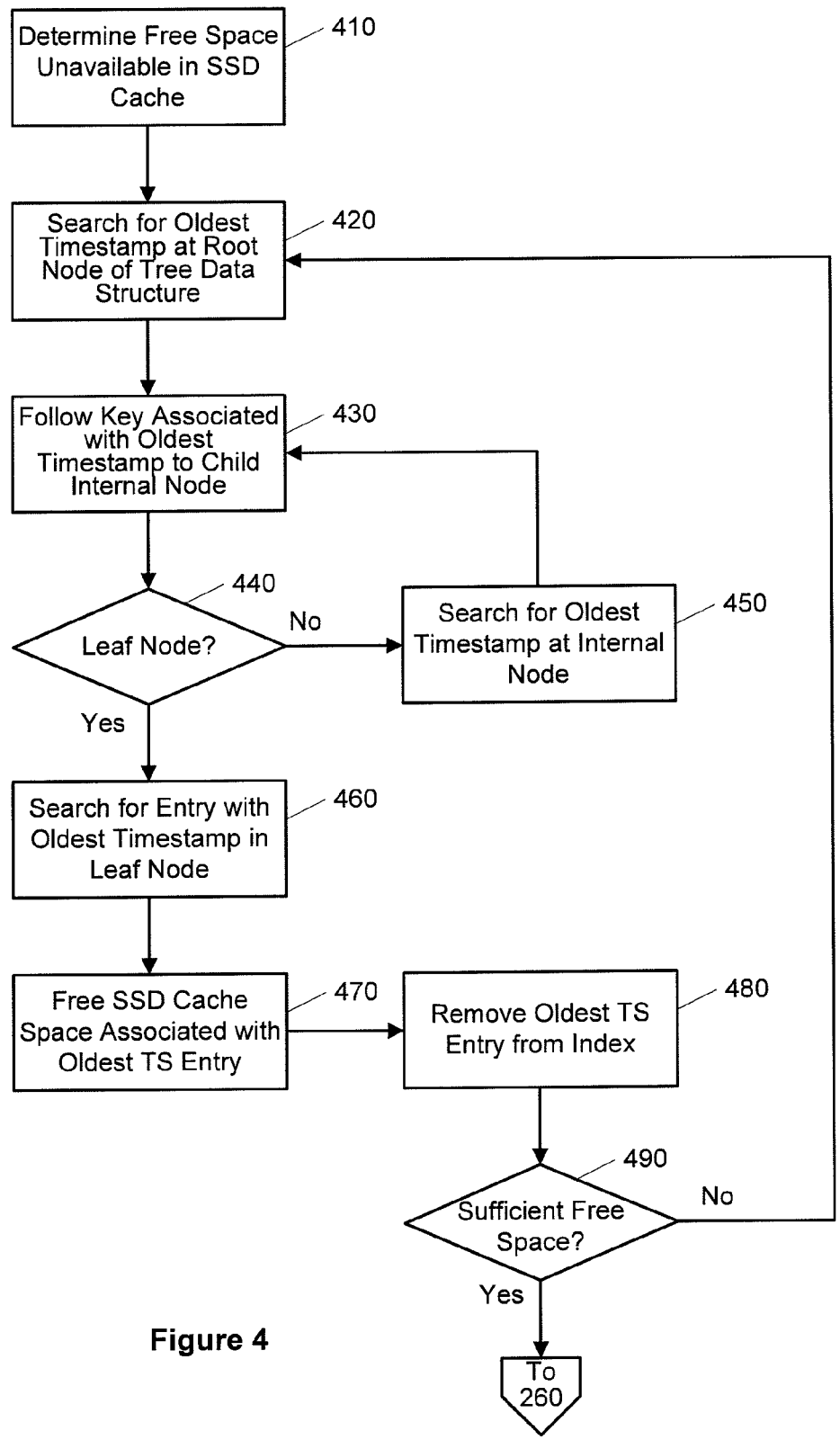
FIG. 4 is a simplified flow diagram illustrating an example of a process for identifying cache space to make available, in accord with embodiments of the present invention.

FIG. 4 is a simplified flow diagram illustrating an example of a process for identifying cache space to make available, in accord with embodiments of the present invention. The process illustrated in FIG. 4 can be used to perform a combination of steps 280 and 290 of FIG. 2.

The process illustrated in FIG. 4 can be performed in response to determining that free memory space for a newly accessed section of an associated storage volume is unavailable in an SSD cache or when available free space in the SSD cache falls below a predefined threshold (410). This step corresponds to conditional step 250 illustrated in FIG. 2. In order to identify SSD cache memory to free up, a search is made for an oldest time stamp associated with a key stored in a root node of a tree data structure storing a table mapping entries of storage volume data locations to SSD cache memory locations (420). The tree data structure can be a B+ tree as illustrated in FIG. 3A, or another tree data structure (e.g., B-tree). Once the oldest time stamp associated with a key is found, a pointer is followed from the key associated with the oldest time stamp to a child node of the root node (430). If the child node is not a leaf node (440), key entries in the internal node are searched for an oldest associated time stamp (450). Once the oldest time stamp is found, a pointer from the key associated with that oldest time stamp is once again followed to the appropriate child internal node (430).

The walk through the internal nodes of the tree data structure continues to be performed until a node storing mapping table entries is reached (e.g., a leaf node of a B+ tree) (440). The mapping table entries of the node are then searched for an oldest time stamp in that node (460). Once the entry having the oldest time stamp is located, the SSD cache memory space associated with that entry is freed up or made available (470). This operation of freeing up or making available the SSD cache memory space allows for subsequent writing of additional data to the identified SSD cache memory space. The entry associated with the oldest time stamp in the node is then removed from the index (480). A determination is then made as to whether there is sufficient free cache memory space available in the SSD cache to store the data from the associated storage volume (490). If not, then an additional search is made for a next oldest time stamp and associated memory (420 et seq.). If sufficient free space is available in the solid state cache, then the flow diagram illustrated by FIG. 2 continues at step 260.

This process of identifying cache space to make available for storage of new data read from the associated storage volume can be performed, for example, by a cache manager 160, as illustrated in FIG. 1. Cache manager 160 can be located on a storage server 110 or other processing device controlling the SSD cache.

Example Computing Environment

Figure 5:
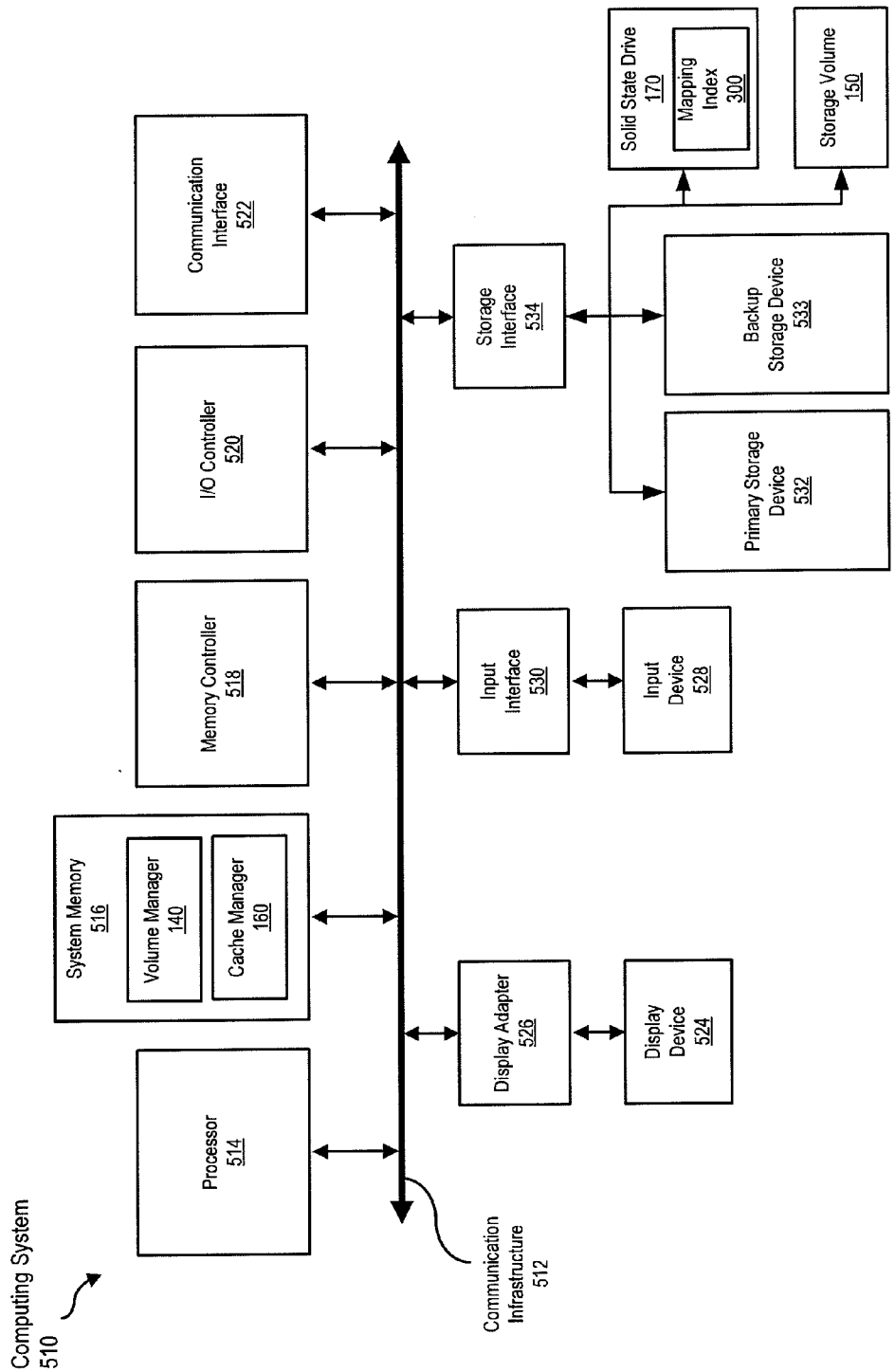
FIG. 5 is a simplified block diagram of a computing system capable of implementing embodiments of the present invention.

FIG. 5 is a block diagram of a computing system 510 capable of implementing a volume manager or a cache manager, as described above. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements a volume manager or a cache manager, computing system 510 becomes a special purpose computing device that is configured to provide high availability of one or more applications.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described or illustrated herein. For example, processor 514 may perform or be a means for performing the operations described herein. Processor 514 may also perform or be a means for performing any other operations, methods, or processes described or illustrated herein.

System memory 516 generally represents any type or form of volatile or non-volatile storage device or medium capable of storing data or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532 or solid state drive 170, as described in detail below). In one example, one or more of a volume manager 140 or cache manager 160 may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform or be a means for performing, either alone or in combination with other elements, one or more of the operations or features described or illustrated herein.

I/O controller 520 generally represents any type or form of module capable of coordinating or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 510 may also include at least one input device 528 coupled to communication infrastructure 512 via an input interface 530. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a primary storage device 532 and a backup storage device 533 coupled to communication infrastructure 512 via a storage interface 534. Storage devices 532 and 533 generally represent any type or form of storage device or medium capable of storing data or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. A storage device like primary storage device 532 can store information such as configuration information 590 (e.g., configuration information indicating the priority of applications and the number of retry attempts per application, as described above).

In certain embodiments, storage devices 532 and 533 may be configured to read from or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. For example, storage volume 150 and solid state drive 170 can be coupled to computing system 510 directly via one or more storage interfaces 534 or indirectly via a network interface (e.g., communication interface 522). Conversely, all of the components and devices illustrated in FIG. 5 need not be present to practice the embodiments described or illustrated herein. The devices and subsystems referenced above may also be interconnected in different ways from that shown in FIG. 5 or described herein.

Computing system 510 may also employ any number of software, firmware, or hardware configurations. For example, one or more of the embodiments disclosed herein may be encoded as a computer program (also referred to as computer software, software applications, computer-readable instructions, or computer control logic) on a computer-readable medium. Examples of computer-readable media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium. Non-transitory computer-readable media include all forms of computer-readable media except for a transitory, propagating signal.

The non-transitory computer-readable medium containing the computer program may be loaded into computing system 510. All or a portion of the computer program stored on the non-transitory computer-readable medium may then be stored in system memory 516 or various portions of storage devices 532 and 533. When executed by processor 514, a computer program loaded into computing system 510 may cause processor 514 to perform or be a means for performing the functions of one or more of the embodiments described or illustrated herein. Additionally or alternatively, one or more of the embodiments described or illustrated herein may be implemented in firmware or hardware. For example, computing system 510 may be configured as an application specific integrated circuit (ASIC) adapted to implement one or more of the embodiments disclosed herein.

Example Network Architecture

Figure 6:
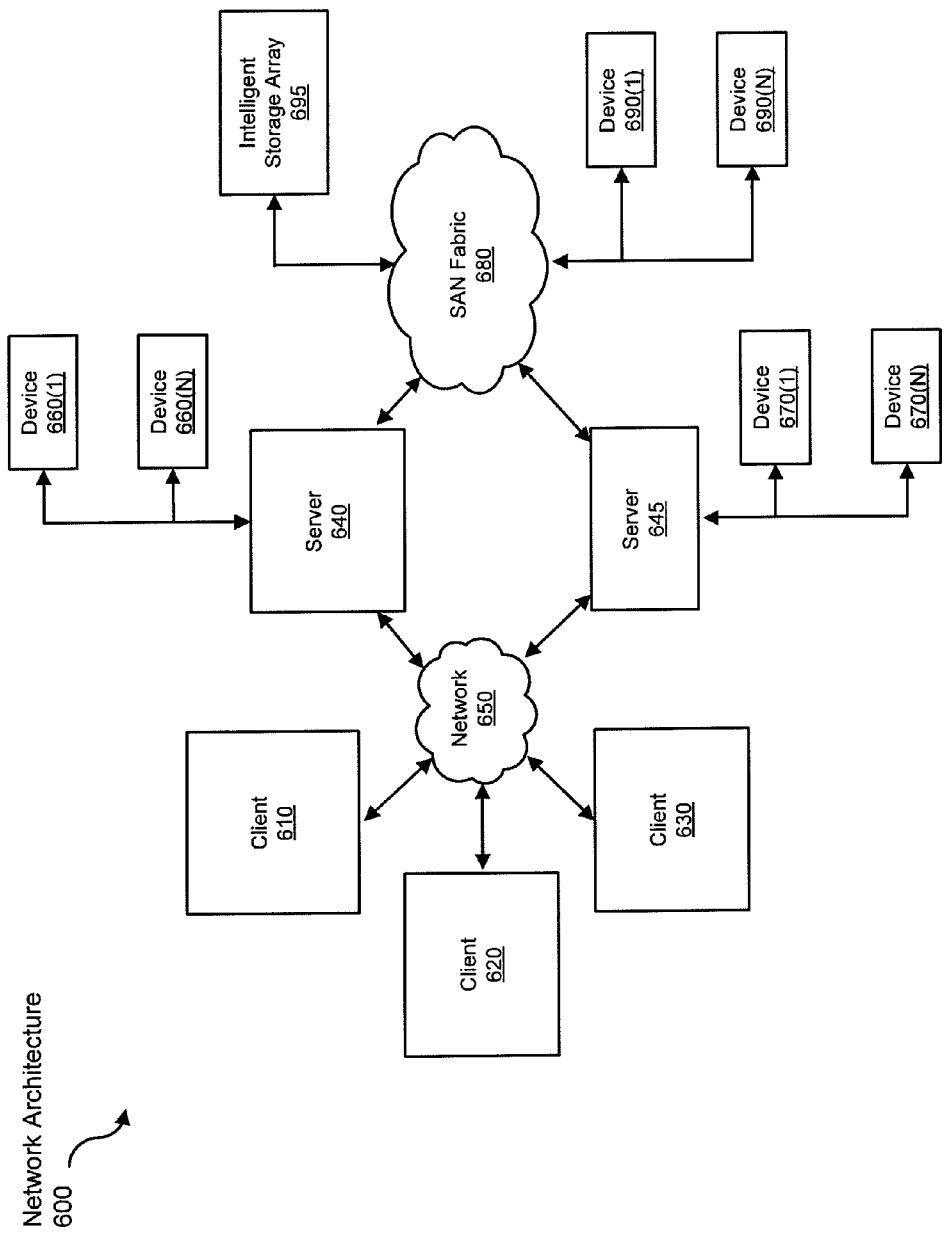
FIG. 6 is a simplified block diagram of an alternative network architecture 600 in which embodiments of the present invention may be implemented.

FIG. 6 is a block diagram of an alternative network architecture 600 in which client systems 610, 620, and 630 (or clients 120) and servers 640 and 645 (or server 110) may be coupled to a network 650. Client systems 610, 620, and 630 generally represent any type or form of computing device or system, such as computing system 510 in FIG. 5.

Similarly, servers 640 and 645 generally represent computing devices or systems, such as application servers or database servers, configured to provide various database services or run certain software applications. Network 650 generally represents any telecommunication or computer network including, for example, an intranet, a wide area network (WAN), a local area network (LAN), a personal area network (PAN), or the Internet. In one example, client systems 610, 620, or 630 or servers 640 or 645 may include monitoring agents or decision-making agents as shown in FIGS. 1 and 2.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) or an intelligent storage array 695. SAN fabric 680 may also facilitate, via network 650 and servers 640 and 645, communication between client systems 610, 620, and 630 and storage devices 690(1)-(N) or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data or other computer-readable instructions.

In certain embodiments, and with reference to computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of the environment illustrated in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   storing a mapping entry comprising a mapping of a storage volume data location to a solid state drive (SSD) memory location, wherein
      the mapping entry is stored in a tree data structure;
   storing data from the storage volume data location in the SSD memory location;
   storing a timestamp with the mapping entry wherein the timestamp is associated with a last time the data stored in the SSD memory location is accessed;
   determining an oldest timestamp of all entries stored in a node of the tree data structure;
   storing the oldest timestamp in association with a key entry linked to the node of the tree data structure in a parent node of the node; and
   finding a least recently accessed SSD memory location, wherein
      the least recently accessed SSD memory location has a first mapping entry stored with the oldest timestamp, and
      the finding comprises
         searching a first node of the tree data structure for the first mapping entry stored with the oldest timestamp,
         if the first node is a leaf node of the tree data structure, identifying the SSD memory location stored in the first mapping entry, and
         if the first node is not a leaf node, performing
            identifying the key in the first mapping entry,
            following the key to a child node, and
            repeating said searching.

2. The method of claim 1 further comprising:
   performing said finding the least recently accessed SSD memory location in response to receiving a request to store second data from the storage volume in the SSD, wherein
      insufficient free space is available in the SSD to store the second data.

3. The method of claim 2 further comprising:
   deleting the first mapping entry stored with the oldest timestamp;
   storing the second data at the SSD memory location;
   storing a second mapping entry comprising a mapping of the storage volume location of the second data to the SSD memory location; and
   storing a second timestamp with the second mapping entry.

4. The method of claim 1 wherein the timestamp comprises one of a clock value and a counter value.

5. The method of claim 1 further comprising:
   accessing the data stored at the SSD memory location; and
   updating the timestamp stored with the mapping entry to a current timestamp.

6. The method of claim 5 further comprising:
   determining the oldest timestamp stored with all entries stored in the node comprising the first mapping entry; and
   updating the oldest timestamp stored in association with the key entry linked to the node comprising the first mapping entry, if the oldest timestamp stored with the entries stored in the node changed.

7. A system comprising:
   a processor;
   a storage volume coupled to the processor, wherein the storage volume comprises one or more hard disk drives;
   a solid state drive (SSD) coupled to the processor; and
   a memory coupled to the processor and storing instructions executable by the processor, the instructions configured to:
      store a mapping entry comprising a mapping of a storage volume data location to a SSD memory location, wherein the mapping entry is stored in a tree data structure,
      store data from the storage volume data location in the SSD memory location,
      store a timestamp with the mapping entry wherein the timestamp is associated with a last access time of the data stored in the SSD memory location,
      determine an oldest timestamp of all entries stored in a node of the tree data structure,
      store the oldest timestamp in association with a key entry linked to the node of the tree data structure in a parent node of the node, and
      find a least recently accessed SSD memory location, wherein
         the least recently accessed SSD memory location has a first mapping entry stored with the oldest timestamp, and
         finding the least recently accessed SSD memory location comprises
            searching a first node of the tree data structure for the first mapping entry stored with the oldest timestamp,
            identifying the SSD memory location stored in the first mapping entry, if the first node is a leaf node of the tree data structure, and
            if the first node is not a leaf node, identifying the key in the first mapping entry, following the key to a child node, and repeating the searching.

8. The system of claim 7 wherein the instructions configured to find the least recently accessed SSD memory location comprise instructions further configured to:
   perform said finding the least recently accessed SSD memory location in response to receiving a request to store second data from the storage volume in the SSD, wherein insufficient free space is available in the SSD to store the second data.

9. The system of claim 8 further comprising the memory storing instructions further configured to:
   delete the first mapping entry stored with the oldest timestamp;
   store the second data at the SSD memory location;
   store a second mapping entry comprising a mapping of the storage volume location of the second data to the SSD memory location; and
   store a second timestamp with the second mapping entry.

10. The system of claim 7 wherein the timestamp comprises one of a clock value and a counter value.

11. The system of claim 7 further comprising the memory storing instructions further configured to:
- access the data stored at the SSD memory location; and
- update the timestamp stored with the first mapping entry to a current timestamp.

12. The system of claim 11 further comprising the memory storing instructions further configured to:
- determine the oldest timestamp stored with all entries stored in the node comprising the first mapping entry; and
- update the oldest timestamp stored in association with the key entry linked to the first node comprising the first mapping entry, if the oldest timestamp stored with the entries stored in the first node changed.

13. A non-transitory computer-readable storage medium storing instructions executable to:
- store a mapping entry in a tree data structure, wherein the mapping entry comprises a mapping of a storage volume data location to a solid state drive (SSD) memory location;
- store data from the storage volume data location in the SSD memory location;
- store a timestamp with the mapping entry wherein the timestamp is associated with a last time the data stored in the SSD memory location is accessed;
- determine an oldest timestamp of all entries stored in a node of the tree data structure;
- store the oldest timestamp in association with a key entry linked to the node of the tree data structure in a parent node of the node; and
- find a least recently accessed SSD memory location, wherein
  - the least recently accessed SSD memory location has a first mapping entry stored with the oldest timestamp, and
  - finding the least recently accessed SSD memory location comprises searching a first node of the tree data structure for the first mapping entry stored with the oldest timestamp,
    - identifying the SSD memory location stored in the first mapping entry if the first node is a leaf node of the tree data structure, and
    - if the first node is not a leaf node, identifying the key in the first mapping entry, following the key to a child node, and repeating the searching.

14. The non-transitory computer-readable storage medium of claim 13, wherein the instructions are further executable to:
- find the least recently accessed SSD memory location in response to receiving a request to store second data from the storage volume in the SSD, wherein insufficient free space is available in the SSD to store the second data.

15. The non-transitory computer-readable storage medium of claim 14, wherein the instructions are further executable to:
- delete the first mapping entry stored with the oldest timestamp;
- store the second data at the SSD memory location;
- store a second mapping entry comprising a mapping of the storage volume location of the second data to the SSD memory location; and
- store a second timestamp with the second mapping entry.

16. The non-transitory computer-readable storage medium of claim 13 wherein
the timestamp comprises one of a clock value and a counter value.

17. The non-transitory computer-readable storage medium of claim 13, wherein the instructions are further executable to:
- access the data stored at the SSD memory location;
- update the timestamp stored with the first mapping entry to a current timestamp;
- determine the oldest timestamp stored with all entries stored in the first node comprising the first mapping entry; and
- update the oldest timestamp stored in association with the key entry linked to the first node comprising the first mapping entry, if the oldest timestamp stored with the entries stored in the first node changed.

\* \* \* \* \*